(12) United States Patent
Bracewell (10) Patent No.: US 8,661,624 B1
(45) Date of Patent: Mar. 4, 2014

(54) PORTABLE AND MODULAR CLEAT WITH MULTIPLE ANCHORING CAPABILITY

(76) Inventor: Mark C Bracewell, Claycomo, MO (US)

( * ) Notice: Subject to any disclaimer, the term of this patent is extended or adjusted under 35 U.S.C. 154(b) by 58 days.

(21) Appl. No.: 13/401,960

(22) Filed: Feb. 22, 2012

(51) Int. Cl.
*F16G 11/00* (2006.01)

(52) U.S. Cl.
USPC .......................... 24/129 R; 24/129 B; 24/130

(58) Field of Classification Search
USPC .......... 24/18, 115 R, 129 B, 129 R, 130, 268, 24/712.9; 114/218
See application file for complete search history.

(56) References Cited

U.S. PATENT DOCUMENTS

| | | | | |
|---|---|---|---|---|
| 192,789 | A * | 7/1877 | Peteler | 24/129 R |
| 1,205,496 | A * | 11/1916 | Whitehead | 24/129 R |
| 1,383,665 | A * | 7/1921 | Rohan | 24/129 B |
| 1,390,152 | A * | 9/1921 | Miltner | 24/129 R |
| 1,426,537 | A * | 8/1922 | Bauer | 24/130 |
| 1,480,006 | A * | 1/1924 | Ortman | 24/129 R |
| 1,565,041 | A * | 12/1925 | Arney | 24/129 R |
| 1,583,343 | A * | 5/1926 | Duerden | 24/129 R |
| 1,986,994 | A * | 1/1935 | Armacost | 24/18 |
| 2,048,300 | A * | 7/1936 | Showers | 242/407 |
| 2,136,014 | A * | 11/1938 | McDonald | 114/218 |
| 2,229,935 | A * | 1/1941 | Powers | 24/131 R |
| 2,245,878 | A * | 6/1941 | Sorensen | 182/142 |
| 2,386,836 | A * | 10/1945 | Blagden | 410/21 |
| 2,536,159 | A * | 1/1951 | Darkins | 24/130 |
| 2,577,212 | A * | 12/1951 | Scheuerlein | 242/388.2 |
| 2,642,640 | A * | 6/1953 | Mills | 24/130 |
| 2,881,498 | A * | 4/1959 | Valentine, Jr. et al. | 24/130 |
| 3,090,343 | A * | 5/1963 | Ronsheim | 114/218 |
| 3,675,276 | A * | 7/1972 | Nuse | 24/130 |
| 3,736,925 | A * | 6/1973 | Erman | 606/204.35 |
| 4,034,443 | A | 7/1977 | Turner | |
| 4,092,075 | A * | 5/1978 | Kimball | 403/72 |
| D275,262 | S * | 8/1984 | Kimball | D8/356 |
| D289,373 | S * | 4/1987 | Kimball | D8/382 |
| 4,910,834 | A | 3/1990 | Minkler | |
| 5,205,687 | A * | 4/1993 | Boyland | 410/98 |
| 5,209,173 | A * | 5/1993 | Shell | 114/218 |
| 5,230,295 | A * | 7/1993 | Shell | 114/218 |
| 5,232,193 | A * | 8/1993 | Skakoon | 251/4 |
| 5,307,751 | A * | 5/1994 | Shell | 114/218 |
| 5,366,327 | A * | 11/1994 | Nelson | 410/96 |
| 5,519,921 | A | 5/1996 | Templer, Jr. | |
| 5,625,925 | A * | 5/1997 | Richards | 24/129 B |
| 6,015,127 | A | 1/2000 | Carr | |
| 6,412,833 | B2 * | 7/2002 | Lusk et al. | 289/17 |
| 6,485,065 | B2 * | 11/2002 | Lusk et al. | 289/1.2 |
| D466,795 | S * | 12/2002 | Dvorak | D8/367 |

(Continued)

*Primary Examiner* — Robert J Sandy
*Assistant Examiner* — Tyler Johnson
(74) *Attorney, Agent, or Firm* — Hovey Williams LLP (57) ABSTRACT

A portable cleat of a generally two dimensional flat shape with a predetermined thickness having two arms (12) and (12A) projecting at opposite slight angles from a near central point. The arms form an ancient standard cleat shape for winding an elongated tension member (30) in multiple figure eights and finishing with an inverted loop to refrain from tying a knot. The main body (10) has a rear portion containing two apertures (18) and (20) of different sizes to adapt to various anchoring devices. The overall shape of the cleat considers the action-reaction law of physics and is specifically designed to enhance its use under kinetic tension forces. The main body also contains a plurality of holes (22) and (22A) allowing multiple cleats to be fastened together in modular fashion in order to multiply the overall strength yet maintain the designed functionality.

17 Claims, 6 Drawing Sheets

(56) References Cited

U.S. PATENT DOCUMENTS

| | | | | |
|---|---|---|---|---|
| D512,905 S * | 12/2005 | Byers | | D8/382 |
| 7,143,708 B1 * | 12/2006 | Cimino | | 114/219 |
| 7,213,278 B2 * | 5/2007 | Peterson et al. | | 5/413 R |
| 7,353,766 B1 * | 4/2008 | Wiese | | 114/218 |
| 7,513,073 B1 * | 4/2009 | Smith | | 40/623 |
| D604,589 S * | 11/2009 | Johansson | | D8/356 |
| 7,636,986 B2 * | 12/2009 | Sorensen | | 24/130 |
| D629,288 S * | 12/2010 | Kelleghan | | D8/356 |
| 7,856,699 B2 * | 12/2010 | Sorensen et al. | | 24/130 |
| 7,908,716 B2 * | 3/2011 | Sorensen | | 24/130 |
| 8,001,659 B2 * | 8/2011 | Sorensen | | 24/130 |
| 2006/0168772 A1 * | 8/2006 | Sorensen | | 24/130 |
| 2007/0209165 A1 * | 9/2007 | Sorensen et al. | | 24/130 |
| 2009/0241296 A1 * | 10/2009 | Sorensen | | 24/130 |
| 2009/0241297 A1 * | 10/2009 | Sorensen | | 24/130 |
| 2013/0145582 A1 * | 6/2013 | Chupp | | 24/129 R |

* cited by examiner

PORTABLE AND MODULAR CLEAT WITH MULTIPLE ANCHORING CAPABILITY

CROSS-REFERENCE TO RELATED APPLICATIONS

Not applicable

BACKGROUND

1. Field of Invention

This invention relates to devices used for fastening ropes or other similar linear tension members.

2. Description of Prior Art

Devices known as cleats have been used for hundreds of years to securely fasten ropes and cords without necessarily needing to finish the process with the tying of a knot. They are probably most commonly used in boats and within that industry predominately in sail boats. The most familiar objects are the ones attached to a boat dock to temporarily attach the boat to it. Quite similar ones are attached at various points to many boats themselves. These are most commonly designed as a base which is permanently attached and from which two prongs project in opposite directions above the base. The rope is then wound around the prongs of the device in some fashion in lieu of tying a knot. Other uses were for keeping the sails in a particular position while under the influence of the wind. As the transportation industry increased in scope, various needs for tying down cargo became more apparent. Somewhat similar devices have been invented for that endeavor. Most of these inventions are somewhat portable in comparison to a dock cleat. Many are designed to be able to increase tension before the final fastening. Even with that aspect they all have the inherent fault of not being usable in a kinetic situation, such as a highly gusting wind on a sail. Many such as the devices of Turner (U.S. Pat. No. 4,034,443 Jul. 12, 1979) and Minkler (U.S. Pat. No. 4,910,834 Mar. 27, 1990) still require a knot at some point of use. Others such as the devices of Carr (U.S. Pat. No. 6,015,127 Jan. 18, 2000) and Richards (U.S. Pat. No. 5,625,925 May 6, 1997) are designed for two ropes to be used. Carr's also requires knots to be used.

Templer Jr.'s device (U.S. Pat. No. 5,519,921 May 28, 1996) is a very complicated three dimensional object requiring a complex weave to accomplish the fastening. This would be a very slow process, as would the use of Richards' or Carr's. Both Templer's and Minkler's would be expensive and complicated to produce with their protrusions and indentations which would involve die making and/or machining. Richards, Carr, and Turner have more simple designs but lack in speed and ease of use for fastening. They also do not provide for ease of use and fastening under kinetic loads.

Shell's device (U.S. Pat. No. 5,230,295 Jul. 27, 1993) has a simple shape but its anchoring ability is limited and not secure under kinetic changes in load. Even with the rope secured in its desired fashion a slackened tension allows its open hook an opportunity to come loose. An but the Carr and Shell devices are not designed to anchor at all, but function somewhere in the middle of the tensioning member. Those two devices have quite limited anchoring ability.

None of these devices are designed to be combined in a modular fashion to easily and quickly multiply its inherent strength.

SUMMARY

In accordance with the present invention a portable cleat comprises a relatively flat object possessing traditional rope fastening capability, an ability to be a modular component, and having apertures for multiple methods of anchoring.

OBJECTS AND ADVANTAGES

Several objects and advantages of the present invention are:
(a) To provide a portable cleat to fasten elongated tension members without the necessity of tying knots;
(b) To provide a cleat with a designed ability to be functional when the tension member is under changing kinetic conditions;
(c) To provide a cleat with a designed ability to work in conjunction with many simple devices to provide multiple methods of anchoring;
(d) To provide a cleat which is easy and economical to manufacture out of many materials;
(e) To provide a cleat with a designed ability to be fastened in a modular fashion to multiply its strength while maintaining its method of use;
(f) To provide a cleat which is completely scalable in both directions;
(g) To provide a cleat with a provision to easily attach locking devices; and
(h) To provide a cleat which, under tension, follows the law of physics regarding action/reaction to maintain its orientation.

Further objects and advantages will become apparent from a consideration of the ensuing description and drawings.

DRAWING FIGURES

In the drawings, closely related figures or items have the same number but different alphabetic suffixes.

REFERENCE NUMERALS IN DRAWINGS

10 main body of the cleat
12 and 12A forward and rearward arms
14 and 14A rear facing notch
16 and 16A forward facing notch
18 thru 18B large anchor point opening
20 small anchor point opening
22 and 22A holes for modular fastening
24 aperture for locking device
26 and 26A bolts
28 and 28A nuts
30 working end of rope
30A dead end of rope
32 locking strip of chord
32A locking hook-loop strap

DESCRIPTION

Figure 1:
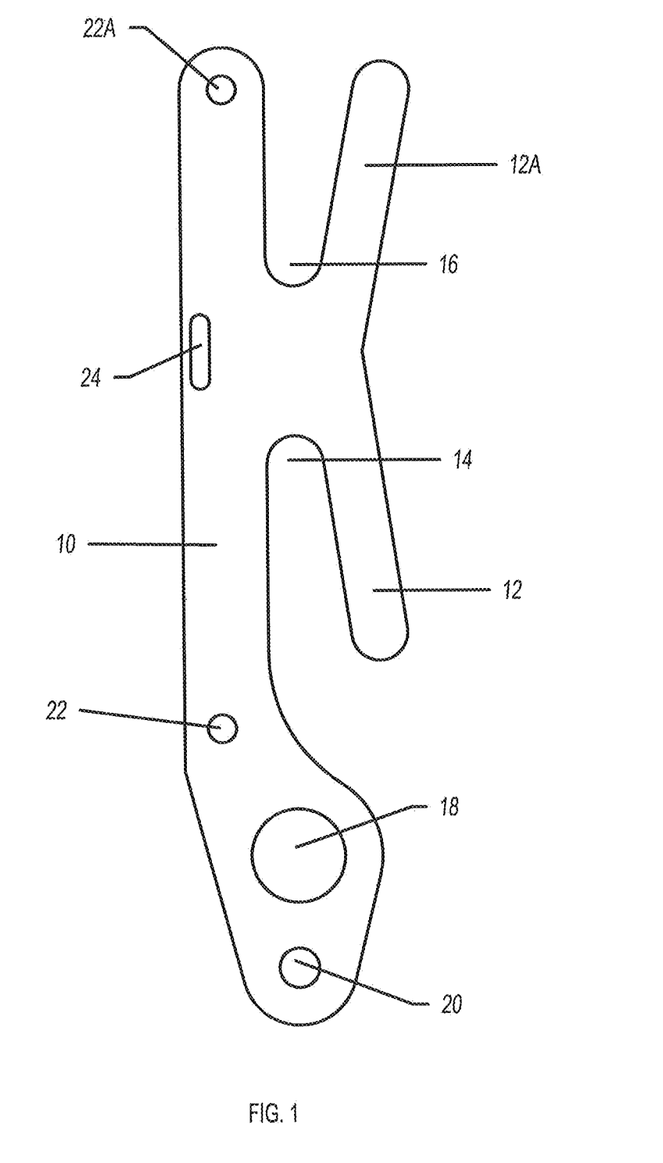
FIG. 1 shows a view of the general shape of the portable cleat and its general two dimensional format.

FIG. 1 Preferred Embodiment

A preferred embodiment of the portable and modular cleat of the present invention is illustrated in FIG. 1. For this description the term forward will be relative to the direction away from the user and towards the direction from which the rope in tension is coming. The term rearward will be relative to the anchor point and away from the rope in tension.

The cleat has a predominately two dimensional shape with a third dimension of a relatively small uniform thickness. The main body 10 is somewhat elongated and fabricated from a structural material, such as aluminum, possessing a predetermined tensile strength. Two arms, 12 and 12A, project from the side of the main body from a point slightly forward of a center point. The two arms project in opposite directions, rearward and forward respectively, and at a slight outward angle from the main body area. The two arms form somewhat V shaped notches with the main body but do so with radial intersections 14 and 16. Arms 12 and 12A leave an amount of material between the two radius intersections 14 and 16 for maximum strength. Two apertures, 18 and 20, are within a bulbous material projecting towards the rear and slightly towards the same direction as the two arms. These are the apertures designed as anchor points. They are different sizes to be easily adapted to combine with other simple devices such as, bolts, stakes, chains with grab hooks, clevis, nylon slings, wire rope, carabiners, or even a loop made from the dead end of the rope in use. This provides a multitude of possibilities to anchor the cleat to many readily available strong stationary objects. The center points of apertures 18 and 20 are aligned on axis with the center points of the radius 14 and 16. This is designed to insure that the tension force produced by the rope end 30 aligns with the equal and opposite resistive force of the anchor acting through the center point of apertures 18 or 20. This alignment will keep the cleat from trying to flip or rotate in a negative manner while the rope is being fastened.

Figure 2:
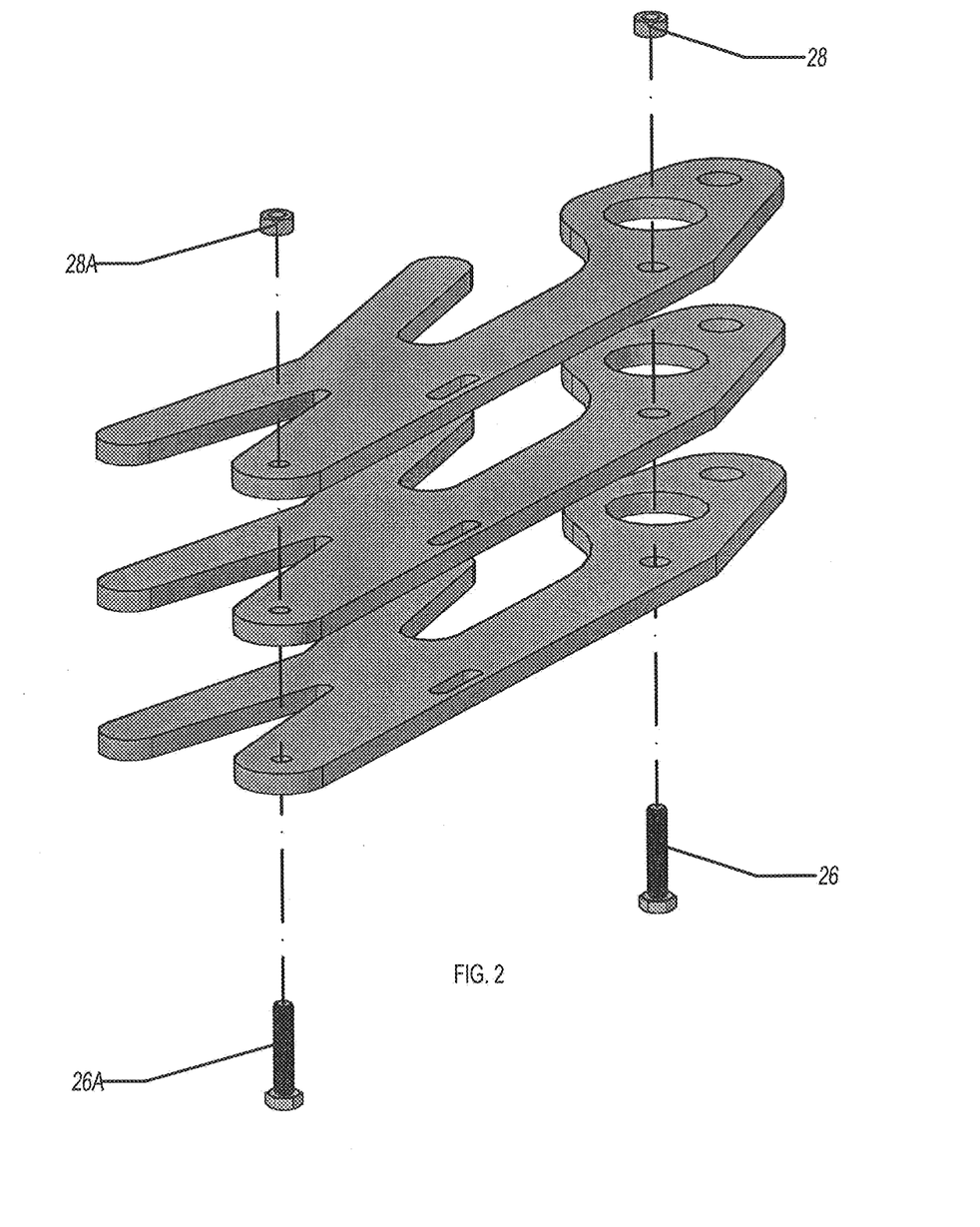
FIG. 2 shows how multiple cleats can be combined in a modular fashion.

The cleat body also is designed to be combined in a modular fashion. It is shown in FIG. 2 that if the user decided that more strength was needed for a give situation, holes 22 and 22A provide for this. These holes are used to bolt more than one cleat together to proportionally increase its strength, as seen with bolts 26 and 26A and their associated nuts 28 and 28A. However by doing this the manor of its intended use is not changed. Another aperture, 24, is provided near the outer edge of the main body opposite the center point of the junction of arms 12 and 12A. This is designed primarily to hold locking devices but could also receive a bolt in modular use.

Figure 5:
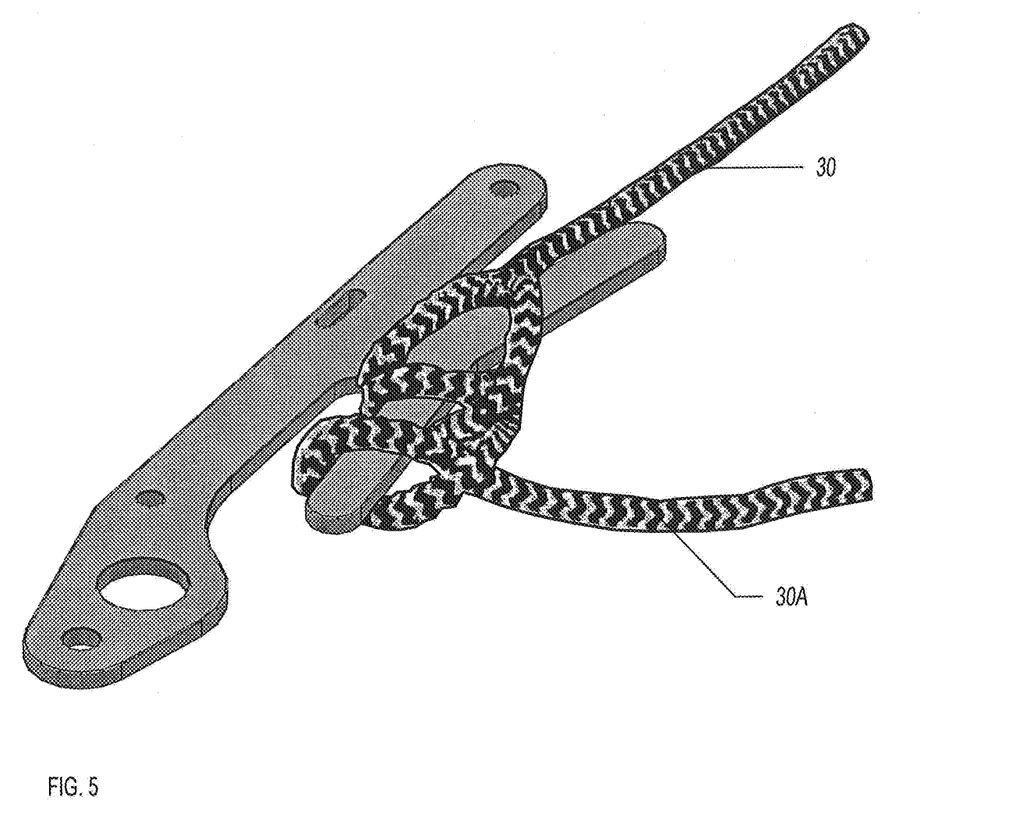
FIG. 5 shows the preferred method of fastening the rope or other tension member.
Figure 6:
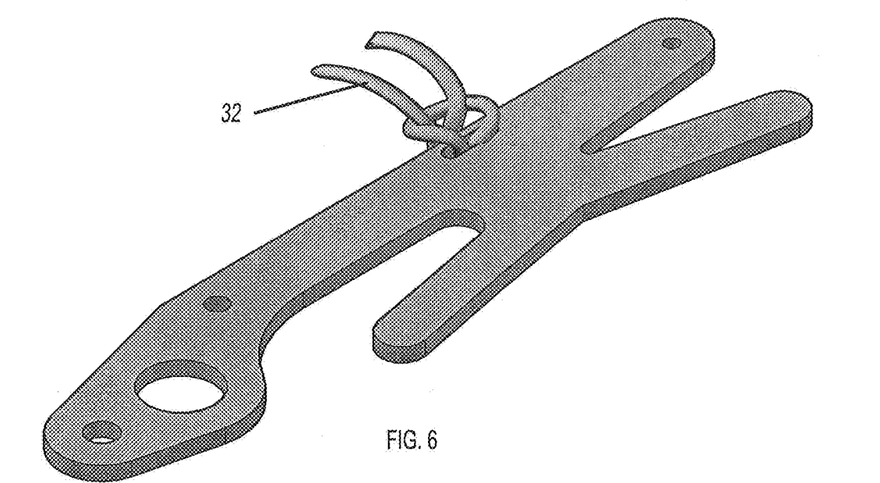
FIGS. 6 and 6A show versions of locking devices fastened to the provided aperture.
Figure 6A:
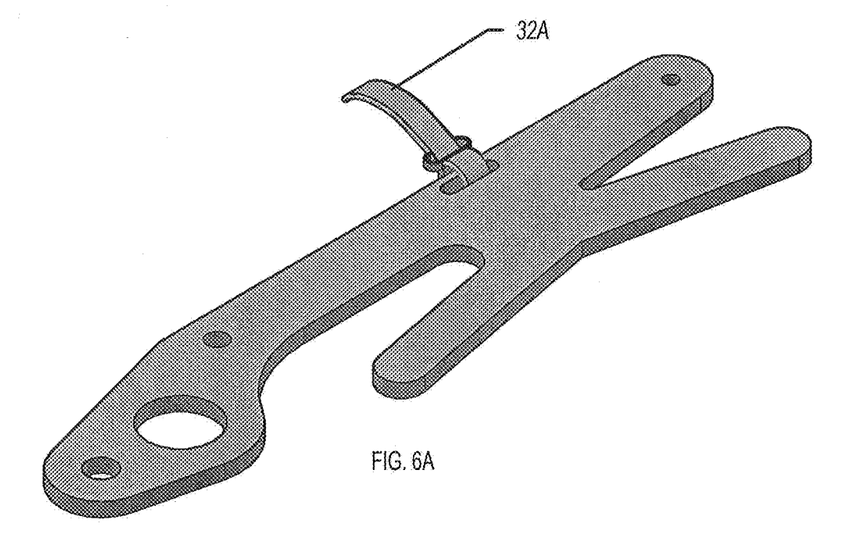

FIG. 5 shows the preferred method of fastening the rope in tension. The forward facing part of the rope, 30, is the working end of the rope and produces the tension force being dealt with. The dead, or non working, end of the rope, 30A, is used to fasten the rope. FIGS. 6 and 6A show two types of locking devices attached at aperture 24. A chord, 32, or hook-loop strap, 32A, could easily be attached in these manners and if so desired left there semi-permanently without disrupting the cleats ability to be stored and transported. These devices can be wrapped around the finished fastened rope to insure against an accidental slipping of the woven rope if so desired. Other devices that do not lend themselves to being attached, but could provide a similar lock, can be used and aperture 24 would keep them in alignment.

Alternative Embodiments

Figure 3:
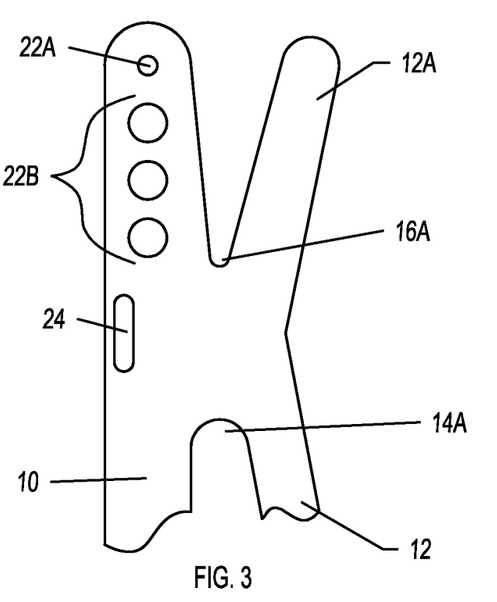
FIG. 3 shows a version with a narrow forward notch and fillet radius rear notch.

Tension members come in different sizes. FIG. 3 shows a form of the cleat with a narrowed forward notch radius 16A. This would allow for a smaller diameter tension member to be dealt with as well as increasing the grip on larger ones. FIG. 3 also shows the rearward notch radius 14A having a fillet radius to its edges to provide smoother passage for the tension member as it is initially being pulled tight.

Figure 4:
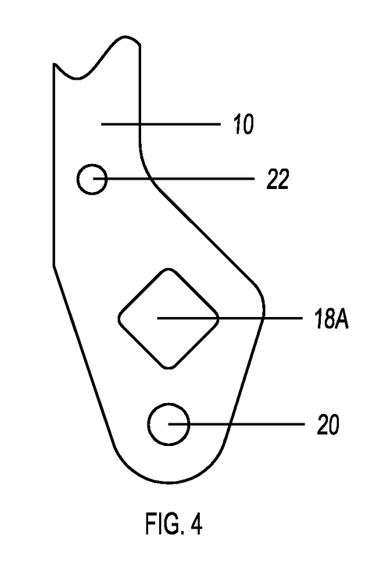
FIGS. 4 and 4A show versions of one of the anchoring apertures possessing alternate geometric shapes.
Figure 4A:
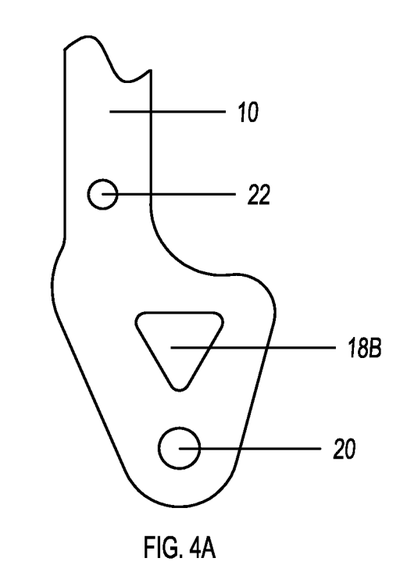

Both FIGS. 4 and 4A show alternate shapes for the large anchoring aperture, 18A and 18B. Their geometric orientation follows the design of having the axis of their rear radius edge fall along the axis of the tension force. Their shape anticipates an end user designing a proprietary anchor system. These could be a driven stake, such as used by large tents, or a fixed anchor that contains a cylindrical column. The top of either could utilize a cap of matching geometry of either aperture. When the cleat's anchor point is slipped over the matching cap and then rotated slightly the geometries would then interfere and would prevent the cleat from slipping off the top of the column.

The general shape of the mobile cleat allows it to be easily manufactured from many materials and methods. Alternative embodiments could be any material a manufacturer or an end user would specify. Since the cleat's design can be scaled up or down proportionally, tremendous differences in required strengths are achieved. Therefore an even wider source of material can be utilized. Cleats could be small enough to be used with sewing thread or fishing line, or so large it could require more than one person to utilize it. FIG. 3 also shows a series of holes, 22B, which could be engineered in several places to simply reduce the weight of the cleat without reducing its strength for a given situation. These holes, along with 22 and 22A, would also provide points to allow an end user to fasten the cleat to a stationary object and thereby create a temporary or permanent fixed cleat.

The general flat shape of the cleat allows for many areas of it to remain exposed after the rope is woven and fastened. This provides places for identification such as brand name or part numbers to be applied by various methods and to maintain visibility even during use. The wide variety of possible materials also allows for an equally wide spectrum of colors to be utilized for various identifications or retail appeal. All common forms of application would apply, such as anodizing, powder coating, painting, plating, or pre colored polymers in an injection molding process. The many holes in the cleat and its flat shape allow for easy bundling for shipping, storage, and hanging for retail display. The cleat may be made from various types of materials. In one embodiment, the cleat is made of metal. In another embodiment, the cleat is made from laminated wood. In yet another embodiment, the cleat is made of thin metal profiles bonded into a lamination. In still yet another embodiment, the cleat is made from a reinforced polymer composite. In such an embodiment, the cleat can contain a central metal armature. Furthermore, the cleat may be molded in a non-reinforced polymer such as, for example, nylon or PTFE.

Operation

Being portable obviously allows the cleat to be subjected to a variety of situations. The user would first identify a relatively strong fixed object deemed suitable for anchoring the cleat against the produced tension. A system of anchoring to that particular object is then adapted to either or both of the anchor point apertures shown in FIG. 1 as 18 and 20. This is accomplished with a variety of common objects such as bolts, stakes, chains with grab hooks, clevis, nylon slings, wire rope, carabiners, or even a loop made from the dead end of the rope in use. The cleat is then held in one hand and the rope or other elongated tension member, 30 in FIG. 5, is then wrapped into the rearward V notch, 14 in FIG. 1 and pulled back in the forward direction to achieve the desired tension. This produces the non working end of the rope, 30A in FIG. 5, which can then be wrapped into the forward V notch, 16 in FIG. 1, producing the initial friction to help retain the tension. This end of the rope is then brought around and up from the forward arm, 12A in FIG. 1, and then over the rearward arm, 12 in FIG. 1, and into the rearward notch 14. This end is then brought under arm 12 and back over arm 12A and back down into notch 16. These actions are then repeated at least one more time creating a figure eight weave. A final securing inverted loop is created by folding the rope end 30A under itself as in FIG. 5 and placed over the rearward arm then pulled down tight preventing the figure eight weave from trying to unwind and release the tension.

If the end user feels kinetic shifts of cyclical slack and tension, produced by gusting winds or such, may cause the weave to lose its final loop it can be locked in place. The devices 32 or 32A, as seen in FIGS. 6 and 6A can be fastened around the figure eight of the rope to keep it in place. Other similar devices that are not shown could be used to achieve this. These could be iron wire, tape, nylon wire ties, etc. Doing this would also allow a degree of safety and comfort if the cleat's situation needed to be left alone for a period of time.

If the end user feels the strength of his available cleats are not sufficient for a given task the modular capability can solve that. The user simply takes two or more cleats and bolts them together as illustrated in FIG. 2. If a more permanent situation is desired and the material used is metal the cleats could be fastened by rivets, or welded. Certain polymer or wooden versions could be bonded with adhesives.

An important aspect of the design is the ability to swivel, especially when flexible materials are used in achieving an anchor. Even the designs of the anchor apertures 18-18B allow for swiveling when a solid bolt or stake is used. This makes the cleat automatically orient itself as best it can towards the tension. This enhances the functionality and safety of the situation by not allowing it to become deformed by side forces or fight the user as he is trying to achieve the figure eight weave under kinetic conditions. This aspect is also aided by the midpoint of arms 12 and 12A being located forward of the overall midpoint of the cleat.

Figure 7:
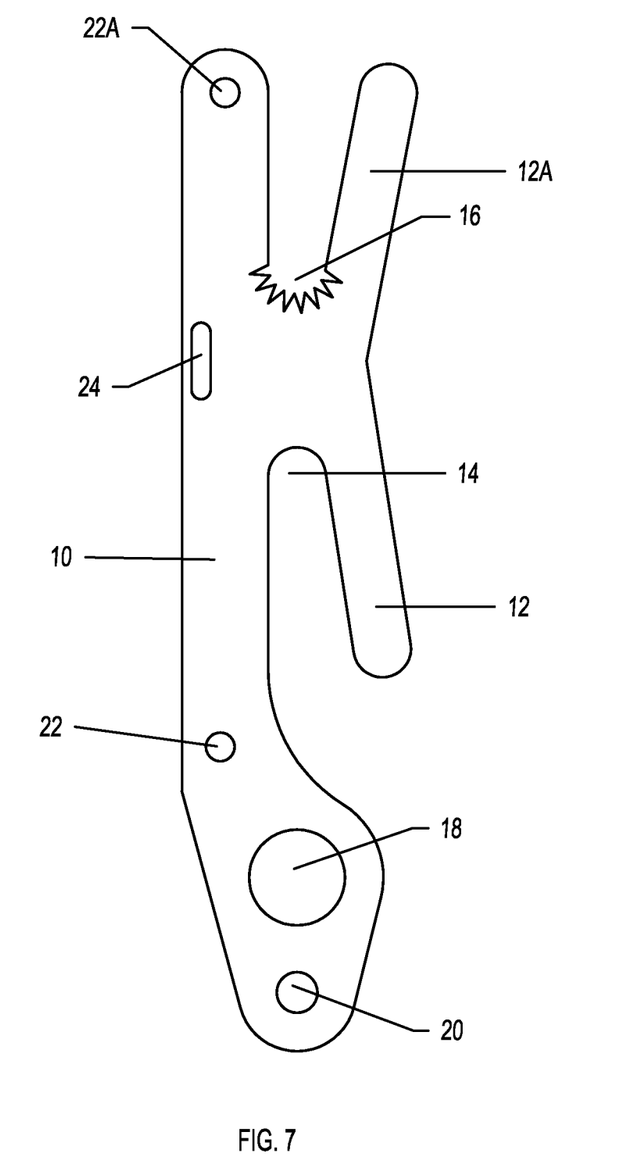
FIG. 7 shows the portable cleat with serrated edges.

FIG. 7 depicts a cleat with the notch of the forward arm 16 having serrated and roughened edges along its terminating radius and associated edges. These serrations and roughened edges provide a means to grip a tension member such as, for example, a rope. All other components in FIG. 7 are marked using the same numerals as in FIG. 1.

CONCLUSIONS, RAMIFICATIONS, AND SCOPE

Accordingly, the reader will see that the cleat is easily portable. The cleat is easily and economically manufactured from common materials. It is easily engineered by its scale and material for handling specific force loads. It is easily engineered for use with specific diameters of tension members. The design of the anchor points allow it to be fixed temporarily to a wide variety of objects. Their design also allows the cleat to swivel and automatically align the resistive force of anchoring with the tension force being contained. The cleat is designed to specifically be functional under varying kinetic conditions and be almost one handed in operation under some conditions. It is also designed to be user-friendly enough to be operated by one person under most conditions. The cleat can also be used in the fashion of a trucker's knot. That being when one end of a rope that is used in a circumferential manner is tied to the anchor point. The other end is then pulled around the cleat to tension the rope and then woven onto the cleat.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A portable cleat for fastening a flexible tension member under static or kinetic force influences wherein said cleat is made from a flat material of uniform predetermined thickness and possesses a predetermined tensile strength;
    wherein said cleat being generally elongated and describing a forward and rearward perspective relative to said tension member and an anchoring point;
    wherein said cleat is configured to provide a meant to fasten said tension member without the aid of a knot;
    wherein said cleat comprises a first arm and a second arm of predetermined widths and lengths projecting outwardly from a juncture from a main body elongated along a linear axis;
    wherein said first arm projects outwardly in a forward direction at an angle away from said main body thereby forming a first V shaped notch and said second arm projects outwardly in a rearward direction at an angle away from said main body thereby forming a second V shaped notch;
    wherein the center point of said juncture of said arms is at a forward position relative to the overall linear center point of said cleat;
    wherein the geometric center points of said first V shaped notch and said second V shaped notch line on an axis parallel to the linear axis of said main body;
    wherein said main body contains a plurality of holes configured to connect one or more additional cleat units onto said cleat in a stacking modular fashion;
    wherein said main body has a bulbous projection on its rearward end projecting away from said main body in the direction toward said first arm and said second arm;
    wherein said bulbous projection contains a plurality of apertures of varying sizes configured to provide a means for attaching a variety of anchoring devices; and
    wherein the geometric center points of said apertures are aligned on the axis of the geometric center points of said first V shaped notch and said second V shaped notch.

2. The cleat of claim 1 wherein said main body contains a secondary aperture near the outer edge opposite the juncture of said arms providing a means to secure a device, said device in turn providing a means to further secure said fastened tension member.

3. The cleat of claim 1 wherein at least one of said apertures used for anchoring comprises a geometric shape having corners of radial construction.

4. The cleat of claim 1 wherein said first V shaped notch is substantially narrowed in order to provide a means to increase the grip upon said tension member.

5. The cleat of claim 1 wherein said first V shaped notch and its associated edges have serrated surfaces configured to provide a means to grip said tension member.

6. The cleat of claim 1 wherein said second V shaped notch has fillet radius edges.

7. The cleat of claim 1 wherein said cleat is made of metal.

8. The cleat of claim 1 wherein said cleat is made of laminated wood.

9. The cleat of claim 1 wherein said cleat is made of metal profiles bonded into a lamination.

10. The cleat of claim 1 wherein said cleat is made of reinforced polymer composite.

11. The cleat of claim 10 wherein said cleat contains a central metal armature.

12. The cleat of claim 10 wherein said cleat is molded in a non-reinforced polymer such as Nylon or PTFE.

13. The cleat of claim 1 wherein said first V shaped notch terminates in a radius.

14. The cleat of claim 1 wherein said second V shaped notch terminates in a radius.

15. The cleat of claim 2 wherein said anchoring point comprises said secondary aperture.

16. A portable cleat for fastening a flexible tension member, wherein said cleat comprises:
- a main body elongated along a linear axis;
- a first arm and a second arm of predetermined widths and lengths projecting outwardly from a juncture from said main body; and
- a plurality of holes configured to connect one or more additional cleat units onto said cleat in a stacking modular fashion;
- wherein said first arm projects outwardly in a forward direction at an angle away from said main body thereby forming a first V shaped notch and said second arm projects outwardly in a rearward direction at an angle away from said main body thereby forming a second V shaped notch,
- wherein the geometric center points of said first V shaped notch and said second V shaped notch lie on an axis parallel to the linear axis of said main body;
- wherein said main body comprises a bulbous projection projecting away from said main body in the direction toward said first arm and said second arm;
- wherein said bulbous projection contains a plurality of apertures of varying sizes configured to provide a means for attaching a variety of anchoring devices; and
- wherein the geometric center points of said apertures are aligned on the axis of the geometric center points of said first V shaped notch and said second V shaped notch.

17. The cleat of claim 16 wherein said first V shaped notch and said second V shaped notch terminate in a radius.

* * * * *

UNITED STATES PATENT AND TRADEMARK OFFICE
CERTIFICATE OF CORRECTION

PATENT NO. : 8,661,624 B1
APPLICATION NO. : 13/401960
DATED : March 4, 2014
INVENTOR(S) : Mark C. Bracewell It is certified that error appears in the above-identified patent and that said Letters Patent is hereby corrected as shown below:

In the Specification:

Column 1, Line 56, the text beginning the sentence "An but the Carr and..." should read:

-- All but the Carr and --

In the Claims:

Column 6, Lines 15-16, the text in claim 1 reciting "wherein said cleat is configured to provide a meant to fasten..." should read:

-- wherein said cleat is configured to provide a means to fasten --

Column 6, Lines 30-31, the text in claim 1 reciting "wherein the geometric center points of said first V shaped notch and said second V shaped notch line on an axis..." should read:

-- wherein the geometric center points of said first V shaped notch and said second V shaped notch lie on an axis --

Signed and Sealed this
Twenty-seventh Day of May, 2014

Michelle K. Lee
*Deputy Director of the United States Patent and Trademark Office*